July 23, 1940.                G. C. JETT                2,209,023
                      VARIABLE SPEED POWER DRIVE
                        Filed Nov. 1, 1939            2 Sheets-Sheet 1
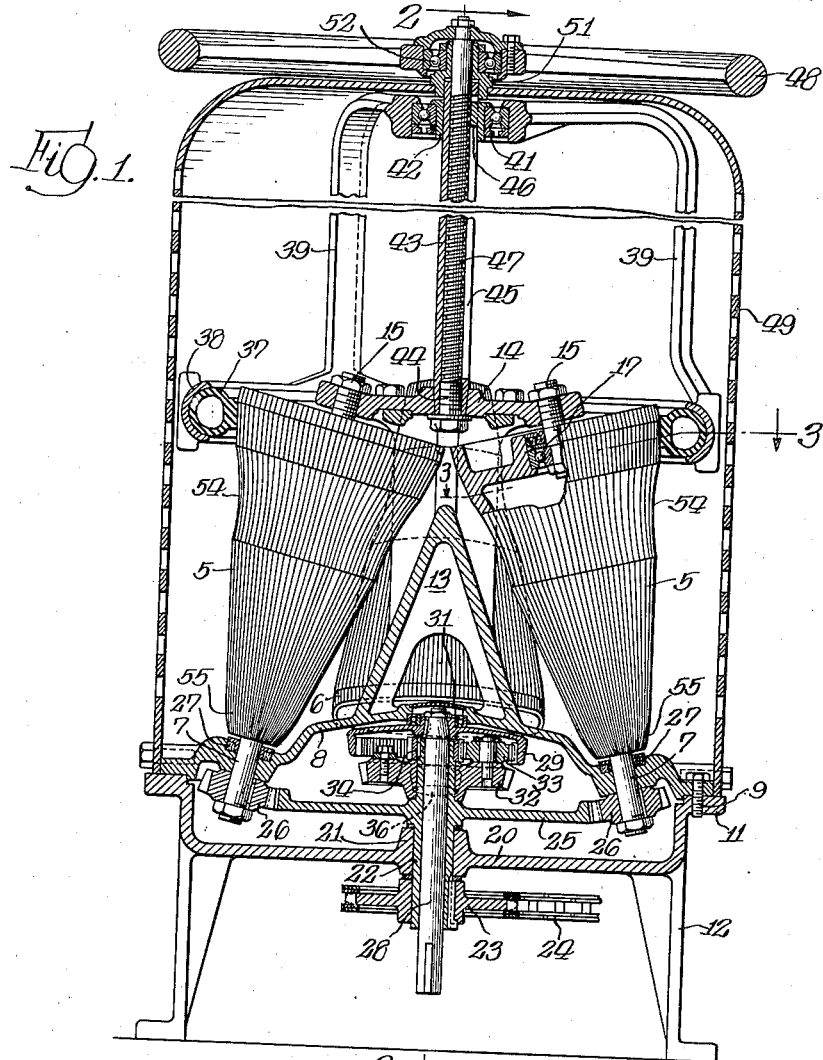
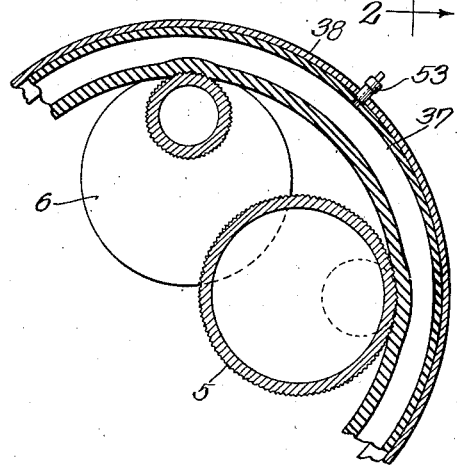
INVENTOR.
George C. Jett,
BY
                ATTORNEY.

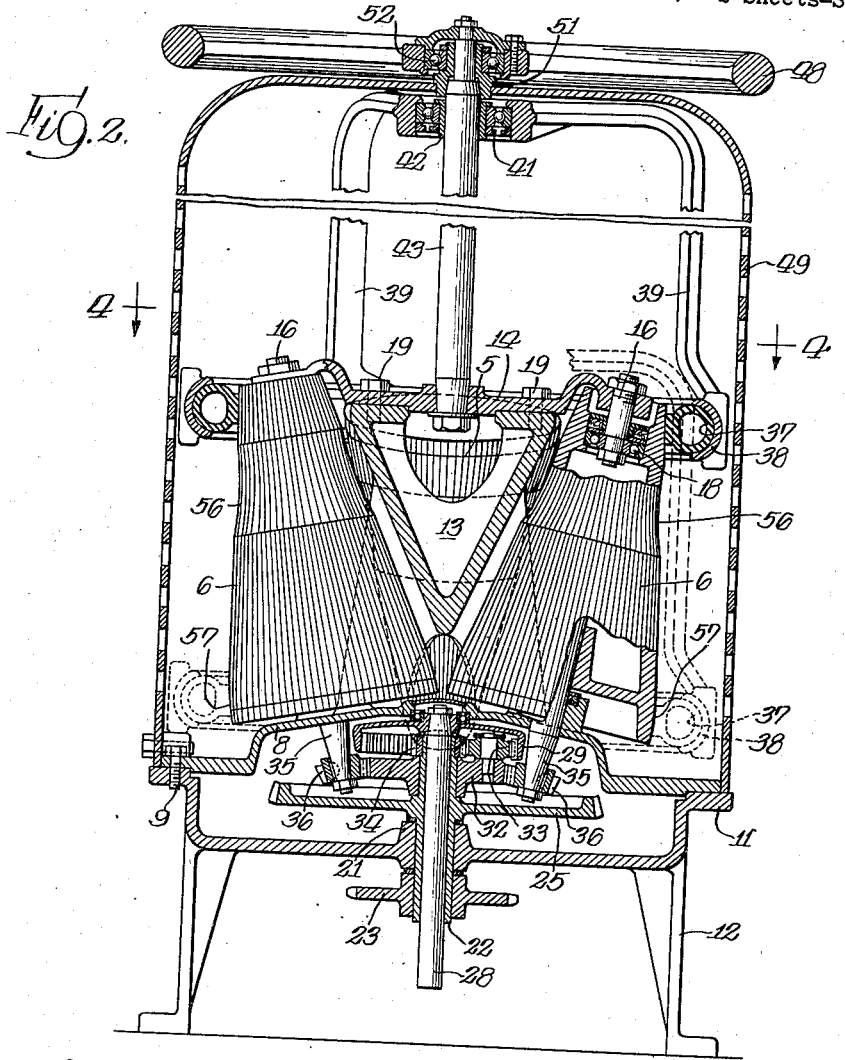
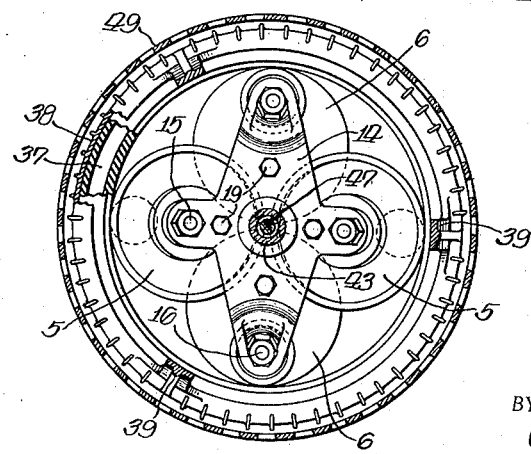

Patented July 23, 1940

2,209,023

UNITED STATES PATENT OFFICE 2,209,023

VARIABLE SPEED POWER DRIVE

George C. Jett, Milwaukee, Wis.

Application November 1, 1939, Serial No. 302,301

13 Claims. (Cl. 74—284)

This invention relates in general to power transmission mechanisms and more particularly to that type adapted to convert a constant speed input into an infinitely variable speed output, the mechanism being capable of manual adjustment throughout the entire range of an infinitely variable speed cycle, and while continuously transmitting power. The present application is a continuation in part of application Serial No. 150,272, filed June 25, 1937.

I am aware that variable speed transmitting mechanisms comprising a pair of oppositely disposed frustro-conical rollers or pulleys connected by a shiftable belt through which power is transmitted from one pulley to the other have heretofore been employed, but due to the difficulty of controlling the belt because of its tendency to creep toward the larger ends of the pulleys, such transmission mechanisms are not considered very practical and are not generally used for the transmission of heavy power. One of the purposes of my present invention is to provide a variable speed power drive which is capable of use for heavy duty purposes, which is compact in arrangement so as to occupy a minimum of space, which can be readily and easily adjusted for speed variation purposes while in operation, which is capable of maintaining the power output shaft at zero revolutions while under load and with the power input shaft continuously driven at a constant speed, and which will be durable and reliable in operation and capable of being economically produced.

With these ends in view, my invention contemplates the provision of a mechanism comprising a plurality of frustro-conical driving rolls or pulleys and a corresponding plurality of driven frustro-conical rolls or pulleys in conjunction with a circular driving element encircling and embracing all of the driving and driven rolls so as to frictionally engage the rolls and transmit without appreciable slippage or loss of power the rotative movement of the driving rolls to the driven rolls. The encircling driving element is carried by a rigid ring or rim which is freely rotatable so as to partake of the rotative movement of the rolls and is adjustable longitudinally of the rolls for speed variation purposes. Unlike a driving belt, which has an inherent tendency to whip between the rolls or pulleys and to creep toward the larger ends of the rolls, thereby producing strains upon the belt which shorten its effective life, my novel, rigidly supported driving element is at all times under complete control so that all tendency to whipping is obviated and any creeping tendency is effectively counteracted without the imposition of destructive strains upon the element.

Another feature of my invention resides in the structure of the driving element itself which, instead of being a flat belt, is constructed in the form of a pneumatic tire or tube mounted at its outer perimeter within an annular rim and having the tread formed upon its inner perimeter for frictional driving engagement with the driving and driven rolls encircled by the pneumatic driving element. In this novel type of power transmitting drive, the power transmitted without slippage or loss is dependent upon three factors, namely, the degree of pressure between the surrounding pneumatic driving element and the encircled driving and driven rolls, the contact area between each roll and the driving element, which is determined by the extent of the depression of the rolls into the surface of the driving element and the character of the engaging surfaces of the rolls and the driving element. In accordance with my invention, the pressure factor is dependent upon the amount of air pressure within the pneumatic driving element. The contact area between each roll and the driving element is dependent upon the setting of the roll with respect to the driving element, and the effective frictional engagement between the rolls and the driving element is raised to the maximum by corrugating or otherwise roughening the surfaces of the rolls.

Another feature of my invention resides in the arrangement of the parts in such a manner that the planetary or other gearing utilized in the conversion of the power transmitted is located coaxially with the center of the group of driving and driven rolls and between the rolls and between the ends thereof so that a very sturdy and compact arrangement which occupies a minimum of space is attained.

Other purposes and advantageous features of my invention will be appreciated as the same becomes better understood by reference to the following description when considered in connection with the accompanying drawings.

Referring to the drawings,

Fig. 1 is a longitudinal sectional view through a power transmitting device embodying my invention;

Fig. 2 is a sectional view on the line 2—2 of Fig. 1;

Fig. 3 is a fragmentary somewhat diagrammatic sectional view on the line 3—3 of Fig. 1; and Fig. 4 is a sectional view on the line 4—4 of Fig. 2.

Referring to the drawings more in detail, it will be observed that the power transmitting mechanism comprises a plurality of, in the present instance two, driving rolls or pulleys 5 and an equal number of driven rolls or pulleys 6. The driving and driven rolls are arranged in alternation about a common center or axis from which the most remote points of all the rolls are equally spaced. The rolls are all frustro-conical in form, the driving rolls being positioned with their larger ends uppermost, and the driven rolls being positioned with their smaller ends uppermost. The axes of the rolls are inclined, as will be apparent from Figs. 1 and 2, so that the longitudinal line included in the perimeter of each roll which is most remote from said common axis is parallel therewith, equi-distant from the axis, and parallel with the corresponding lines of all the other rolls. The shafts projecting from the lower ends of the driving rolls are journalled in suitable bearings 7 carried by an inverted dished frame plate 8 secured at its perimeter by bolts 9 to the flange 11 of the base or standard 12 upon which the mechanism is mounted.

A standard 13 rising centrally from the plate 8 carries at its upper end a head 14 shaped as shown in Fig. 1 to provide supports for the centering studs 15 of the driving rolls and the similar studs 16 of the driven rolls. The upper ends of the driving rolls are rotatably mounted on the studs 15 through the intermediary of the ball bearings 17, and the driven rolls are similarly mounted on studs 16 through the intermediary of the ball bearings 18. Bolts 19 secure the head 14 to the upper end of the standard 13. The studs 15 and 16 are threaded through and longitudinally adjustable with respect to the head 14 to thereby afford facility for longitudinal adjustment of the position of the driving and driven rolls whereby the radial distance from the axis, about which the rolls are grouped, to the most remote point of each roller may be regulated for purposes which will be later explained.

The transversely extending wall 20 of the base 12 is provided with a central bearing 21 in which is journalled a sleeve shaft 22 carrying below the bearing a sprocket wheel 23 or a gear or a pulley which constitutes the power input element of the mechanism. The sprocket illustrated in this instance is adapted to be driven by a chain 24 which in turn is driven at a constant speed from any suitable source of power.

A large, slightly beveled gear 25 is fixed upon the sleeve or hollow shaft 22 above bearing 21 and is drivingly meshed with the beveled pinions 26 fixed upon the drive roll shafts projecting through bearings 7. Suitable packing 27 surrounds these shafts to preclude oil leakage between the chamber included between plate 8 and wall 20 and the chamber surrounding the driving rolls 5 and 6. The hub of gear 25 is extended upwardly and forms a continuation of sleeve 22 in which is journalled a shaft 28 carrying at its upper end an internal gear 29, the upper end of the shaft above the gear being rotatably guided in bearings 31 carried by the inverted plate 8. Shaft 28 constitutes the power output shaft of the mechanism. A beveled gear 32 journalled upon the upstanding hub carries a plurality of (in the present instance 3) planet pinions 33 meshing with the internal gear 29 and with a sun pinion 34 fixed on the hub above the gear 32.

The lower end of each driven roll shaft 35 carries, as best shown in Fig. 2, a pinion 36 meshing with the beveled gear 32, whereby a driving connection is established between the driving rolls 5 and the driven rolls 6 through the planetary transmission carried by the hollow shaft 22. This planetary connection serves not to drive one set of rolls from the other, but as a synchronizing mechanism through which the speed of the power output shaft 28 is regulated and controlled.

Driven rolls 6 are driven from the driving rolls 5 through the intermediary of a circular, flexible pneumatic driving element frictionally engaging a segment of the perimeter of each of the driving and driven rolls. While the driving element may be made of any suitable material possessing the desired characteristics, it is here illustrated as being in the form of a pneumatic tire or tube 37 having the tread or driving face upon the inner perimeter of the tube instead of upon the outer perimeter, as is customary with pneumatic vehicle tires. This driving element is mounted in a surrounding rim or carrier 38 of substantial and rigid construction which is rotatably supported by the arms 39 of an open frame which in turn is rotatably carried by a ball bearing assembly 41 mounted on a sleeve 42 which is slidable longitudinally of a guide tube 43 anchored at its lower end by a bolt 44 in the head 14. This tube is longitudinally slotted at one side, as indicated at 45, to accommodate a segmental nut 46 fixed to the sleeve 42, which nut threadedly engages a screw threaded rod 47 housed within the tube 43. To the upper end of this rod there is removably attached a hand wheel 48 by which the rod may be rotated to raise and lower the open frame through the intermediary of the segmental nut 46.

To enable the removal of the casing 49 surrounding the group of rolls, the driving element and its supporting frame, a sleeve 51 is fixed therein and provided with a tapered socket to receive the upper end of tube 43, and between this sleeve and the inner walls of the hub of the hand wheel, a ball bearing assembly 52 is interposed.

In Figs. 1 and 2, the driving element 37 is shown in its upper position, and in Fig. 2 it is shown in dotted lines in its lowermost adjusted position. By manipulation of the hand wheel, the driving element may be adjusted to any intermediate position between the two extremes illustrated, and by means of such adjustment the speed of the driven rolls relatively to that of the driving rolls may be regulated to a fine degree of nicety. For instance, when the driving element is in its uppermost position engaging the rolls 5 at their largest diameters and the driven rolls 6 at their smallest diameters, the driving element will be caused to revolve around the rolls at maximum speed, thereby driving the driven rolls at maximum speed. At the other extreme position of the driving element illustrated in dotted lines in Fig. 2, the driving element, since it engages the driving rolls at their smallest diameter, will be driven at minimum speed, and since it at the same time engages the driven rolls on their greatest diameter, these rolls will be in turn driven at minimum speed. It will be apparent, therefore, that with the driving rolls rotated at a constant speed, a wide variation in the speed of rotation of the beveled gear 32 driven by the driven rolls 6 may be attained by adjusting the driving element 37 to infinitely variable positions within the limits of its adjustability.

To assure adequate driving friction between the tread of the driving element 37 and the driving and driven rolls 5 and 6 embraced thereby and to insure against slippage and loss of power in the driving, the surfaces of both the driving and driven rolls are roughened, preferably by providing them with small longitudinally extending corrugations, as illustrated on the drawings, particularly in Fig. 3. This figure also illustrates the depression of the driving and driven rolls into the flexible driving element 37 so as to enlarge the area of contact between the rolls and the element and to, in effect, cause the element to be partially wrapped around the rolls. This wrapping action and increase in contact area manifestly increases the tractive or driving friction between the element of the rolls and correspondingly reduces the liability of slippage. As previously mentioned, the pressure between the rolls and the driving element may also be regulated by adjustment of the rolls which, in effect, decreases or diminishes their spread, and further provision for pressure regulation is afforded by the driving element itself within which the air pressure may be increased or diminished as occasion requires in a manner commonly employed in connection with automobile tires. The driving element is provided with a valve equipped nipple 53 through which the air pressure within the driving element may be increased or diminished as desired.

In some uses of a transmission of this type, the load at certain speeds may be very light. Consequently, for conservation of energy and reduction in wear, it may be desirable to relieve to some extent the driving pressure between the rolls and the driving element 37. To accomplish this result, the diameter of the driving and driven rolls may be slightly diminished at such point or points in their length as will correspond with such light load speeds as determined by the position of adjustment of driving element 37. For instance, the driving rolls illustrated are shown as relieved or slightly reduced in diameter throughout an area indicated by reference character 54 and again near their smaller ends, as indicated by 55. Correspondingly, the driven rolls are reduced or relieved at 56 and also at their larger ends, as indicated by 57. Such relief of pressure reduces the friction on the roll bearings and reduces the expenditure of energy required in depressing the driving element. At such points of pressure relief, the driving element will contact the driving and driven rolls with sufficient pressure to drive them under light load conditions and, when adjusted to other speeds for heavy load conditions, the normal driving pressure between the rolls and the driving element will be resumed.

The mechanism illustrated and described may be mounted in any desired position, but is here shown as being vertically disposed. This position is preferably where a rubber driving element 37 is employed which must be kept free from contact with oil, as in this instance the planetary and all of the driving gears are housed in a chamber beneath the rolls where they may run in an oil bath or oil spray, without danger of oil leakage, upwardly into the rolls or the driving element.

The operation of the mechanism described is substantially as follows:

Power is delivered through gear or sprocket 23 to the hollow shaft 22, thereby driving the gear 25 and the driving rolls 5 through the gears 26. These rolls in frictional engagement with the driving element 37 cause this element to revolve about its supporting bearing 41, thereby driving the driven rolls 6, which through the pinions 36 drive the beveled gear carrier 32 carrying the planet pinions 33 meshing with the sun pinion 34 fixed on shaft 22 and also with the internal gear 29 fixed upon the upper end of power output shaft 28.

The beveled gear 32 constitutes a spider for a planetary mechanism comprising the planet pinions 33, sun pinion 34, and internal gear 29, all of which revolve about the driven outlet shaft 28. The sun pinion 34 constitutes one of the driving members and being driven at a constant speed tends to drive the internal gear 29 at a reduced constant speed in the opposite direction. The spider or gear 32 constitutes the other driving member which tends to drive the internal gear 29 in the same direction as that of the sun pinion 34 but many times faster than the sun gear when the driving element 37 is in its top speed or uppermost adjusted position.

Downward adjustment of the driving element 37 will decrease the speed of internal gear 29 until when in its lowest position, as shown in dotted lines on Fig. 2, the speed of spider gear 32 carrying planet pinions 33 bears such relation to the speed of the sun gear 34 that the driving effects of these gears upon internal gear 29 are exactly neutralized, and the planet pinions thereupon revolve and rotate within the internal gear which remains stationary. The shaft 28 is under these conditions held stationary while under its full torque load. Other adjusted positions of the driving element 37 will cause the shaft to be rotated at infinitely variable speeds depending upon the adjusted position of the driving element.

It is believed that my invention and many of its inherent advantages should be appreciated from the foregoing as also the fact that the structural details illustrated and described may be varied within considerable limits without exceeding the scope of the invention as defined in the following claims.

I claim:

1. In a variable speed power transmitting mechanism, the combination of a plurality of frustro-conical driving rolls, a plurality of frustro-conical driven rolls arranged in alternation with said driving rolls about a common axis, the rolls being so arranged that the driving rolls taper in the opposite direction from the driven rolls and the outermost surfaces of all the rolls are disposed substantially parallel with said axis and the same radial distance therefrom, means for rotating said driving rolls, a circular driving element surrounding and frictionally engaging all of said rolls for transmitting the rotation of the driving rolls to the driven rolls, means for maintaining the plane of said driving element perpendicular to said axis, and means for adjusting said driving element longitudinally of said rolls to vary the speed of the driven rolls relatively to that of the driving rolls.

2. In a variable speed power transmission mechanism, the combination of a plurality of driving and driven rolls arranged in alternation about a common central axis, said rolls being frustro-conical in form and mounted with the driving rolls tapering in the opposite direction from the driven rolls and with the outermost faces of all of the rolls disposed substantially parallel with and substantially equidistant from said central axis, a circular driving element surrounding and embracing all of the rolls, means for adjusting said driving element longitudinally of the rolls, and means for rotating the driving rolls.

3. In a variable speed power transmission mechanism, the combination of a plurality of frustro-conical rolls arranged in a circle about a common central axis, alternate rolls being tapered in opposite directions and the outer faces of all the rolls being disposed in substantial parallelism with said axis, a circular driving element surrounding and frictionally engaging said outer faces of all the rolls, means for adjusting said driving element lengthwise of the rolls, means for driving the rolls of a group tapering in one direction, and means for transmitting power from the other group of rolls tapering in the opposite direction.

4. In a variable speed power transmission mechanism, the combination of a plurality of frustro-conical driving rolls, a plurality of frustro-conical driven rolls arranged alternately with the driving rolls about a common central axis, the driving rolls tapering in one direction and the driven rolls tapering in the opposite direction and the most remote points on the surfaces of all the rolls being spaced equi-distant from said axis, the surfaces of all of said rolls being roughened, a circular driving element surrounding all of said rolls and frictionally contacting the roughened surfaces thereof, the roll contacting surface of said driving element being yieldable to increase the area of surface contact between said element and the rolls, and means for adjusting said element longitudinally of the rolls.

5. In a variable speed power transmission mechanism, the combination of a plurality of frustro-conical, longitudinally corrugated driving rolls, a plurality of frustro-conical longitudinally corrugated driven rolls, the driving rolls tapering in the opposite direction from the driven rolls and all of the rolls being grouped around a common central axis so as to present the outermost points on their surfaces at substantially equal radial distances from said axis, a pneumatic tubular driving element surrounding said group of rolls and provided on its inner periphery with a friction tread frictionally engaging all of said rolls, said tread being yieldable to increase the area of contact between the tread and the rolls, means for supporting said driving element with the diameter thereof disposed in a plane perpendicular to said axis, and means for adjusting the position of said driving element longitudinally of the rolls.

6. In a variable speed power transmitting mechanism, the combination of a group of rolls of frustro-conical form arranged about a common central axis with the taper of adjacent rolls extending in the opposite direction and with the axes of all the rolls inclined toward and intersecting said common axis so as to present the outermost points on the surfaces of all the rolls at a substantially equal radial distance from said axis, a tubular air-filled, resilient driving element surrounding said rolls and having an internal, yieldable tread frictionally engaging each of the rolls, a rigid annular supporting member for said driving element, and means for adjusting said member longitudinally of the rolls.

7. In a variable speed power transmission mechanism, the combination of a plurality of frustro-conical driving rolls, a plurality of frustro-conical driven rolls arranged in alternation with said driving rolls about a common central axis, the driving and driven rolls being tapered in opposite directions and positioned to dispose the outermost points of their surfaces substantially equi-distant from said axis, an annular tubular driving element provided with a yieldable internal tread frictionally engaging said outermost surface points of said rolls, and means whereby said rolls may be adjusted to regulate the pressure between said rolls and said driving element.

8. In a variable speed power transmission mechanism, the combination of a plurality of frustro-conical driving rolls, a plurality of frustro-conical driven rolls arranged in alternation with said driving rolls about a common central axis, the driving and driven rolls being tapered in opposite directions and positioned to dispose the outermost points on their surfaces substantially equi-distant from said axis, an annular tubular driving element provided with a yieldable internal tread frictionally engaging said outermost surface points of said rolls, and means whereby the resiliency of said driving element may be varied to regulate the pressure between said driving element and said rolls.

9. In a variable speed power transmission mechanism, the combination of a plurality of frustro-conical driving rolls, a plurality of frustro-conical driven rolls arranged in alternation with said driving rolls about a common central axis, the driving and driven rolls being tapered in opposite directions and positioned to dispose the surface points thereof most remote from said axis substantially equi-distant from said axis, an annular tubular driving element provided with a yieldable internal tread frictionally engaging said outermost surface points of said rolls, means whereby said rolls may be adjusted to regulate the pressure between said rolls and said driving element, and means whereby the resiliency of said driving element may be varied to regulate the pressure between said driving element and said rolls.

10. In a variable speed power transmission mechanism, the combination of a series of frustro-conical rolls grouped in a circle about a common central axis with the rolls alternately tapering in opposite directions and so positioned that the outer longitudinally extending face lines of all the rolls are substantially equi-distant from said axis, an annular pneumatic driving element provided with an internal friction face surrounding and frictionally engaging all of said rolls, and means for adjusting said driving element longitudinally of the rolls, one or more of said rolls being of slightly reduced diameter at a predetermined point between its ends to relieve the pressure against said driving element at a predetermined driving speed.

11. In a variable speed power transmission mechanism, the combination of a plurality of frustro-conical driving rolls, a plurality of frustro-conical driven rolls, the taper of the driving rolls extending in the opposite direction from that of the driven rolls and said driving and driven rolls being arranged in alternation about a common central axis, means for rotating the driving rolls at a common speed, and power transmitting mechanism positioned concentrically with said axis and within a circle including the shafts of said rolls and connected to receive power delivered by said driven rolls.

12. In a variable speed power transmission mechanism, the combination of an upwardly crowned supporting member, a plurality of frustro-conical driving rolls journalled at one end in said member, a plurality of frustro-conical driven rolls journalled at one end in said member, said driving and driven rolls being tapered in opposite directions and arranged in alternation about a common central axis with the outermost portion of all the rolls substantially equi-distant from said axis, means for driving the driving rolls at a common speed, an annular driving element for transmitting the rotation of the driving rolls to the driven rolls, means for adjusting said element longitudinally of the rolls to vary the speed between the driving and driven rolls, a power transmitting unit positioned beneath the crown portion of said member coaxially with said axis and between the ends of the roll shafts, and a driving connection between said driven rolls and said unit.

13. In a variable speed power transmission mechanism, the combination of a power input shaft, a plurality of frustro-conical driving rolls, a driving connection between said shaft and said rolls, a plurality of frustro-conical driven rolls, said driving and driven rolls being arranged in alternation about a common central axis with the driving and driven rolls tapering in opposite directions, a driving element surrounding and frictionally engaging all of said rolls, a power output shaft coaxial with said axis, a power transmission unit encircled by the shafts of said rolls and comprising a sun gear driven by the power input shaft, an internal gear connected with said power output shaft, a spider gear connected with said driven rolls and planetary pinions carried by said spider gear and meshing with said sun gear and with said internal gear, and means for adjusting said driving element longitudinally of the rolls to vary the speed between said driving and driven rolls so that said power output shaft may be maintained motionless under full torque load while the power input shaft is continuously driven.

GEORGE C. JETT.